United States Patent
Bartolome et al.

(10) Patent No.: US 6,721,687 B2
(45) Date of Patent: Apr. 13, 2004

(54) ELECTRONIC DEVICE EVALUATION SYSTEM

(75) Inventors: Eduardo Bartolome, Dallas, TX (US); Kevin Quynh Nguyen, Richardson, TX (US)

(73) Assignee: Texas Instruments Incorporated, Dallas, TX (US)

(*) Notice: Subject to any disclaimer, the term of this patent is extended or adjusted under 35 U.S.C. 154(b) by 13 days.

(21) Appl. No.: 09/870,081

(22) Filed: May 30, 2001

(65) Prior Publication Data

US 2002/0183974 A1 Dec. 5, 2002

(51) Int. Cl.$^7$ ............................................... G06F 15/00
(52) U.S. Cl. ........................................................ 702/187
(58) Field of Search ................................. 702/187, 188, 702/121, 182, 183, 122, 117, 118, 119, 120; 707/10

(56) References Cited

U.S. PATENT DOCUMENTS 6,393,591 B1 * 5/2002 Jenkins, IV et al. ........ 714/725

* cited by examiner

*Primary Examiner*—Michael Nghiem
(74) *Attorney, Agent, or Firm*—Wade James Brady, III; Frederick J. Telecky, Jr.

(57) ABSTRACT

An electronic device evaluation system (100) includes a potential customer located at a site (102) that accesses a company site (106) via a computer network such as the internet (104). The company site (106) includes a computer such as a server (108) which is coupled to one or more evaluation boards (110, 112) and instrumentation (114). Using the system (100) a potential customer or visitor can remotely evaluate an electronic device or system of interest using parameters he selects and the results are sent back after the evaluation is conducted at the company site (106). Using system (100) potential customers, site visitors, etc. can evaluate electronic devices/systems of interest in real-time without the need to purchase an evaluation board and spend the time and resources needed to conduct the tests.

14 Claims, 2 Drawing Sheets

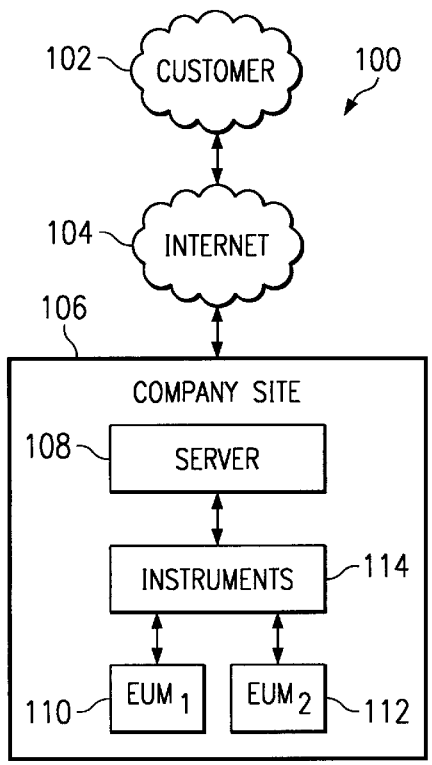
FIG. 1
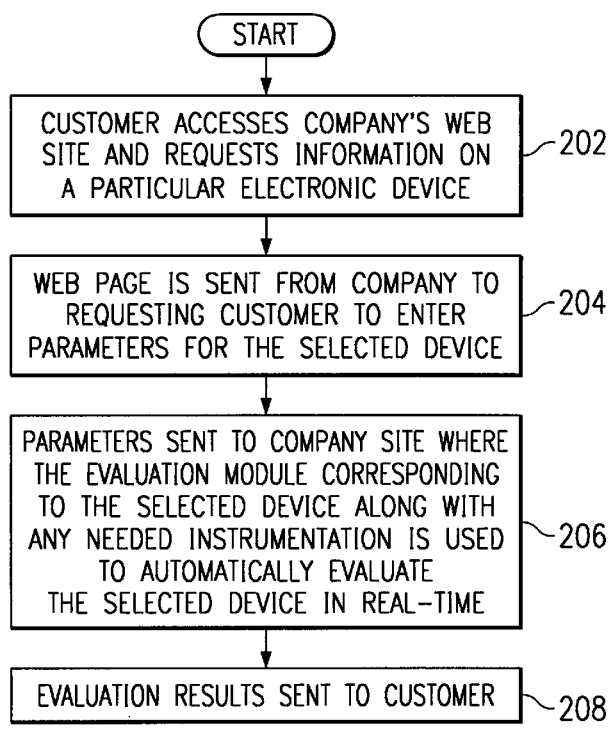
FIG. 2
```
FS:         FIN:       AVDD:   DVDD:   DRVDD:   AIN:
80000000    1000000    3.1     1.8     1.8      3650
Internal Ref:
INT Ref ▼
Chip Version?
1 ▼
SELECT CLK DUTY CYCLE OR CLK SQUARE?
SQUARE ▼
CLKLOW:            CLKHIGH:
0                  1.0
ACQUIRE   ~302
Note: Please wait until new window pop up!
```
FIG. 3

ELECTRONIC DEVICE EVALUATION SYSTEM

TECHNICAL FIELD

This invention relates in general to the field of electronics and more particularly to an Internet based system and method for remotely evaluationing electronic devices.

BACKGROUND

Electronic devices such as integrated circuits are marketed to potential customers using data sheets that provide performance and operating information for the electronic device. For some electronic devices (e.g., digital signal processors, etc.), evaluation boards are provided to customers so they can run real-time tests on the devices before making a decision as to whether or not they want to "design-in" the electronic device into their product.

Although evaluation boards are very useful, they imply a cost for the potential customer since he will need to provide the appropriate equipment, software, technical personnel and time to test the device. Evaluation boards in some instances may turn out to be a waste of time and money if after conducting a few tests the potential customer determines the device is not appropriate for his/her design needs.

From the electronic device manufacture's standpoint, application support engineering resources are also wasted if after evaluating a device using an evaluation board, a potential customer decides not to use the electronic device in question. A need thus exists in the art for a system and method, which can overcome some of the problems mentioned above.

BRIEF DESCRIPTION OF THE DRAWINGS

The features of the present invention, which are believed to be novel, are set forth with particularity in the appended claims. The invention, may best be understood by reference to the following description, taken in conjunction with the accompanying drawings, in the several figures of which like reference numerals identify like elements, and in which:

FIG. 1 shows a block diagram of an electronic device evaluation system in accordance with the invention.

FIG. 2 shows a flow diagram of the steps taken in accordance with the invention.

FIG. 3 shows a typical request screen sent so that particular test parameters can be requested for the evaluation.

DETAILED DESCRIPTION OF THE PREFERRED EMBODIMENT

Figure 4:
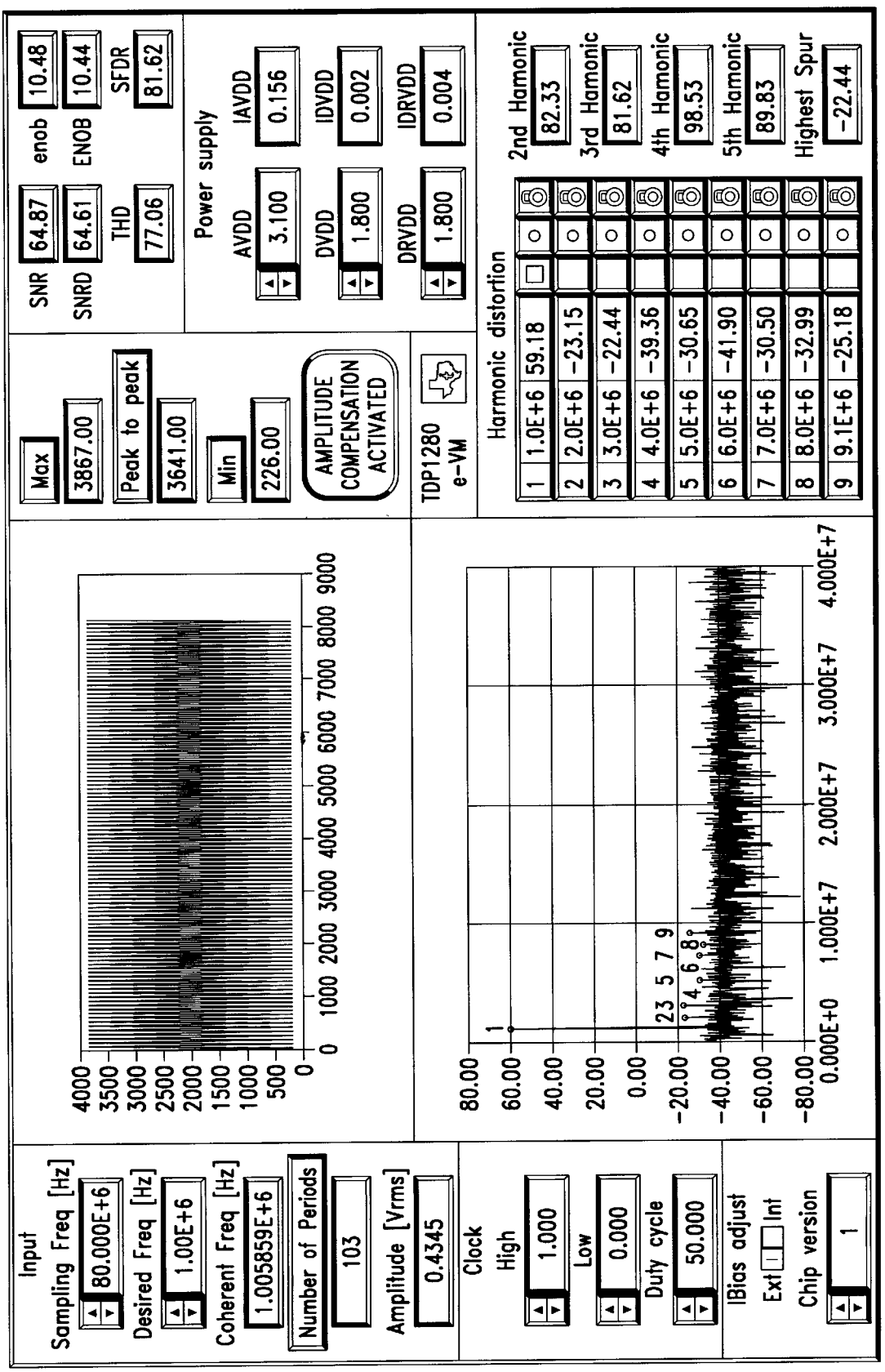
FIG. 4 shows a typical result screen sent after the evaluation has been conducted in accordance with the present invention.

While the specification concludes with claims defining the features of the invention that are regarded as novel, it is believed that the invention will be better understood from a consideration of the following description in conjunction with the drawing figures, in which like reference numerals are carried forward.

Referring now to FIG. 1, there is shown a block diagram of an electronic device evaluation system 100 in accordance with the invention. Instead of providing or selling evaluation boards to test electronic devices to potential customers, in accordance with the invention, a potential customer or any other remote user can use the present invention to remotely run real-time tests on the electronic device in question without having to acquire an evaluation board of his/her own. The electronic device evaluation system 100 is fully automatic and requires no human intervention, which reduces the cost of supporting the system as compared with having application engineers work with customers who are using evaluation boards on their own.

A company site 106 includes a server or other computer 108 which is interconnected with a customer/site visitor 102 via the internet 104 or other computer network. The server 108 is coupled to test instrumentation 114. Any type of instrumentation (e.g., voltmeters, digital oscilloscopes, etc.) 114 needed to run the evaluations is coupled to the one or more evaluation boards 110, 112. To lower the cost of the system, any mutually useable instrumentation (also known as test equipment) 114 is shared with the one or more evaluation boards 110, 112.

The evaluation boards EVM1 110, EVM2 112 are coupled to the instrumentation 114. Each of the evaluation boards 110, 112 supports a particular electronic device that is being provided for evaluation to potential customers, etc. Electronic devices supported can include any type of integrated circuit (e.g., digital-signal processor (DSP), analog-to-digital converters (ADC), etc.) or electronic systems (e.g., wireless device chip set, etc.). The electronic device evaluation boards 110, 112 typically include all the necessary peripheral circuitry including input/output (I/O) circuitry needed to test the device.

Using system 100, the potential customer, etc. 102 can setup through his/her Internet browser any parameters of relevance for the evaluation of the device (part), and obtain real-time test results very quickly without the expense of acquiring his own evaluation board. The server 108 includes any appropriate software (e.g., National Instruments Inc. LabView™ program, etc.) to support the evaluation of the device in question. This can include all necessary software required to communicate with the evaluation boards 110, 112 and instrumentation 114.

Referring now to FIG. 2, there is shown a flowchart highlighting some of the steps taken in accordance with the preferred embodiment. In step 202, a customer using an Internet browser such as NETSCAPE™ accesses the server 108. After requesting to run an evaluation on a particular electronic device (e.g., ADC, etc.) a screen display such as shown in FIG. 3 is sent to the customer in step 204, so he can provide test parameters (e.g., input and sampling frequencies, the clock amplitude, the power supplies and load of the ADC, etc.) he wants to use to evaluate the device. The parameter requesting screen sent to the customer does not allow him/her to enter any parameters that are outside the electronic device's capabilities in that way it avoids damaging the evaluation system.

Once the customer enters the evaluation parameters he wants to use to evaluate the part he/she has selected, the customer then presses the "ACQUIRE" button 302 so that that the requested parameters are sent to the company site 106 in step 206. Upon receiving the information, server 108 provides the necessary information to the corresponding evaluation board, for example $EVM_1$ 110 and instrumentation 114 in order for the real-time evaluation to be conducted. The evaluation results are collected by server 108 using the appropriate software such as LABVIEW™ and in step 208, the evaluation results are sent back to the customer browser and/or to another internet/e-mail address designated by the requester. An illustrative example, of a results screen that is sent to the customer's browser in step 208 is shown in FIG. 4.

Every time the requesting user clicks the ACQUIRE button, he/she will get a new browser window. In this way, he/she can compare the results from several experiments. Although it has been discussed above that different electronic device have their own evaluation board, it should be noted that several electronic devices can share the same evaluation board for cost savings and if technically feasible.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims. The present invention provides for an easy and cost effective way of potential buyers of electronic devices/systems to evaluate a part over the Internet. In this way a potential customer can save the time and expense of buying and using an evaluation board to test a part he/she is considering to purchase.

What is claimed is:

1. A method for enabling a customer to remotely evaluate an electronic device without the need of providing any specific instrumentation, hardware, or software by the customer at the customer location, comprising the steps of
   (a) receiving at a remote evaluation site a request by the customer to evaluate a particular electronic device at the customer location over a computer network;
   (b) in response to the request, providing from the remote evaluation site to the customer location a request for specific data;
   (c) then submitting the requested specific data by the customer to the remote evaluation site over the computer network for use in the evaluation of the electronic device at the remote evaluation site;
   (d) conducting an evaluation of the electronic device using the specific date and using an automatic electronic device evaluation system located at the remote evaluation site; and
   (e) then sending real-time evaluation results of the electronic device that is being tested in step (d) over the computer network from the remote evaluation site back to the customer.

2. A method as defined in claim 1, wherein in step (e) includes the sub-steps of:
   (c1) receiving the one or more parameters submitted in step (c);
   (c2) selecting an evaluation board that corresponds to the particular electronic device requested in step (a);
   (c3) providing the one or more parameters to the evaluation board so that the particular electronic device can be evaluated; and
   (c4) collecting the results of the evaluation.

3. A method as defined in claim 2, wherein in step (c3) the particular electronic device is tested in real-time by the evaluation board.

4. A method as defined in claim 1, wherein the request in step (a) is sent over the Internet.

5. A method as defined in claim 1, wherein in step (e) the evaluation results are sent to the party making the request in step (a).

6. A method as defined in claim 1, wherein in step (d) the evaluation results are sent to an Internet address or email address designated in the request in step (a).

7. A method as defined in claim 1, wherein in step (d) includes the sub-step of (c1) using instrumentation to monitor the electronic device during the evaluation.

8. A system for allowing a customer located at a remote site to evaluate an electronic device or system without the need of providing any specific instrumentation, hardware, or software by the customer at the remote customer site, comprising;
   a computer disposed at an evaluation site;
   an evaluation board including an electronic device coupled to the computer;
   a computer network coupling a the remote site to the computer; and
   the computer, responsive to a request from the customer located at the remote site for an evaluation of the electronic device providing at the remote site a request for specific data and, responsive to receipt of said specific data and using the evaluation board, conducting an evaluation and providing the evaluation results to the customer located at the remote site via the computer network.

9. A system as defined in claim 8, wherein the computer network comprises the Internet.

10. A system as defined in claim 8, wherein the computer comprises a server.

11. A system as defined in claim 8, further comprising electronic instrumentation coupled to the computer for use in performing the evaluation of the electronic device.

12. A system for allowing a customer located at a remote site to evaluate an electronic device over the Internet without the need of providing any specific instrumentation, hardware, or software the customer at the remote customer site, comprising:
   a computer disposed at an evaluation site and coupled to the Internet;
   a test instrumentation coupled to the computer;
   a plurality of evaluation boards, each evaluation board including a unique electronic device that is available for evaluation by the user customer, the plurality of evaluation boards coupled to the test instrumentation; and
   the computer responsive to a request from the remotely located customer to evaluate a particular electronic device providing from the computer to the remote site a request for specific data and, responsive to receipt of said specific data and using a selected one of said plurality of evaluation boards, conducting an evaluation of the particular electronic device selected using the corresponding evaluation board and test instrumentation and providing the evaluation results back to the customer via the Internet.

13. A system as defined in claim 12, wherein the specific data is certain electronic device parameters, these parameters provided to the corresponding evaluation board so that an evaluation of the particular electronic device selected by the user can be conducted using the parameters chosen by the customer.

14. A system as defined in claim 12, wherein the test instrumentation is multiplexed to the plurality of evaluation boards.

* * * * *